United States Patent
Wu

(10) Patent No.: US 9,219,992 B2
(45) Date of Patent: Dec. 22, 2015

(54) MOBILE DEVICE PROFILING BASED ON SPEED

(71) Applicant: Google Inc., Mountain View, CA (US)

(72) Inventor: Xiaqing Wu, Foster City, CA (US)

(73) Assignee: Google Inc., Mountain View, CA (US)

(\*) Notice: Subject to any disclaimer, the term of this patent is extended or adjusted under 35 U.S.C. 154(b) by 0 days.

(21) Appl. No.: 14/149,769

(22) Filed: Jan. 7, 2014

(65) Prior Publication Data

US 2014/0120899 A1 May 1, 2014

Related U.S. Application Data

(62) Division of application No. 13/612,637, filed on Sep. 12, 2012, now abandoned.

(51) Int. Cl.
| | |
|---|---|
| *H04W 4/02* | (2009.01) |
| *H04W 8/20* | (2009.01) |
| *H04W 8/18* | (2009.01) |
| *H04L 29/08* | (2006.01) |

(52) U.S. Cl.
CPC ............. *H04W 4/027* (2013.01); *H04L 67/303* (2013.01); *H04W 8/18* (2013.01)

(58) Field of Classification Search
CPC ....... H04L 67/303; H04W 4/027; H04W 8/18
USPC ..................... 455/456.1, 456.3, 457
See application file for complete search history.

(56) References Cited

U.S. PATENT DOCUMENTS

| | | | | |
|---|---|---|---|---|
| 6,862,524 B1 * | 3/2005 | Nagda | ................ | G01C 21/3492 340/988 |
| 7,054,614 B1 * | 5/2006 | Hunzinger | ........ | H04M 1/72566 455/411 |
| 7,529,545 B2 * | 5/2009 | Rader | ................... | H04R 25/70 455/268 |
| 8,112,785 B1 | 2/2012 | Cooley et al. | | |
| 8,463,488 B1 * | 6/2013 | Hart | ............................. | 701/32.3 |
| 2004/0075582 A1 * | 4/2004 | Bergan | ...................... | G08G 1/01 340/936 |
| 2005/0232439 A1 * | 10/2005 | Enomoto et al. | ................ | 381/86 |
| 2009/0079555 A1 * | 3/2009 | Aguirre De Carcer et al. | ............................. | 340/441 |
| 2009/0215466 A1 * | 8/2009 | Ahl et al. | ................... | 455/456.1 |
| 2010/0066672 A1 * | 3/2010 | Schoolcraft | ........... | G06F 1/1626 345/158 |
| 2010/0161171 A1 | 6/2010 | Valentine et al. | | |

(Continued)

OTHER PUBLICATIONS

"LocationBot—Zurloid," Google Play, May 12, 2012, retrieved from <https://play.google.com/store/apps/details?id=com.zurloid.locationbotfull&hl=en>.

*Primary Examiner* — Qun Shen
(74) *Attorney, Agent, or Firm* — Dority & Manning, P.A.

(57) ABSTRACT

Systems and methods for modifying settings of mobile device are provided. Method includes determining first geographic location of mobile device. First geographic location is associated with first time. Method also includes determining second geographic location of mobile device. Second geographic location is associated with second time. The method also includes determining a speed of the mobile device based on the first geographic location, the first time, the second geographic location, and the second time. The method also includes associating at least the speed of the mobile device with a device profile. The device profile is a member of a set of device profiles stored within the mobile device. The method also includes adjusting at least one user-interface setting of the mobile device based on the device profile. The at least one user-interface setting is associated with an audio or visual user-interface element of the mobile device.

19 Claims, 6 Drawing Sheets

(56) References Cited

U.S. PATENT DOCUMENTS

| | | | |
|---|---|---|---|
| 2011/0010626 A1* | 1/2011 | Fino | G06F 3/04847 715/727 |
| 2011/0082620 A1* | 4/2011 | Small et al. | 701/29 |
| 2011/0151842 A1* | 6/2011 | Olincy et al. | 455/414.1 |
| 2011/0270679 A1* | 11/2011 | Tziortzis et al. | 705/14.58 |
| 2012/0096249 A1* | 4/2012 | Rubin et al. | 713/1 |
| 2012/0192701 A1* | 8/2012 | Watanabe et al. | 84/622 |
| 2013/0018677 A1 | 1/2013 | Chevrette | |
| 2013/0060400 A1 | 3/2013 | Hahne | |
| 2013/0338962 A1* | 12/2013 | Crandall | 702/142 |

* cited by examiner

| Device Profile Memory 126 |||
|---|---|---|
| Speed Range 128 || Device Profile 130 |
| Speed Range 132 | Geographic Location 134 | Device Profile 136 |
| Geographic Location 302 || Device Profile 304 |
| Time Range 306 || Device Profile 308 |
| Minimum Speed 310 || Device Profile 312 |
| Speed Range 314 || Device Profile 316 |
| Speed Range 318 | Time Range 320 | Device Profile 322 |
| Speed Range 324 / Geo. Loc. 326 | Time Range 328 | Device Profile 330 |

FIG. 3

MOBILE DEVICE PROFILING BASED ON SPEED

CROSS REFERENCE TO RELATED APPLICATION

This application is a divisional application of U.S. patent application Ser. No. 13/612,637, filed Sep. 12, 2012, and entitled, "MOBILE DEVICE PROFILING BASED ON SPEED," the entire disclosure of which is incorporated herein by reference.

FIELD

The subject technology generally relates to mobile devices and, in particular, relates to a system and method for mobile device profiling based on speed.

BACKGROUND

Traditionally, many mobile phones allow users to manually update the settings or profiles on the mobile phones. On this note, some users prefer to have certain settings or profiles under certain circumstances, for example, at a certain time or when the users are engaged in a specific activity, e.g., working or exercising. As the foregoing illustrates, an approach for automatically adjusting user-interface settings of a mobile device may be desirable.

SUMMARY

The disclosed subject matter relates to a method for modifying at least one setting of a mobile device. The method includes determining a first geographic location of the mobile device. The first geographic location is associated with a first time. The method also includes determining a second geographic location of the mobile device. The second geographic location is associated with a second time. The method also includes determining a speed of the mobile device based on the first geographic location, the first time, the second geographic location, and the second time. The method also includes associating at least the speed of the mobile device with a device profile. The device profile is a member of a set of device profiles stored within the mobile device. The method also includes adjusting at least one user-interface setting of the mobile device based on the device profile. The at least one user-interface setting is associated with an audio or visual user-interface element of the mobile device.

The disclosed subject matter further relates to a method of adjusting settings for a mobile device. The method includes receiving an input including a speed range. The method also includes receiving a device profile associated with the speed range. The device profile specifies at least one user-interface setting of the mobile device. The at least one user-interface setting is associated with an audio or visual user-interface element of the mobile device. The method also includes storing the device profile associated with the speed range within the mobile device.

The disclosed subject matter further relates to a mobile device. The mobile device includes a setup module. The setup module is configured to receive an input including a speed range. The setup module is also configured to receive a first device profile associated with the speed range. The first device profile specifies at least one user-interface setting of the mobile device. The at least one user-interface setting is associated with an audio or visual user-interface element of the mobile device. The setup module is also configured to store the first device profile associated with the speed range in a device profile memory within the mobile device. The device profile memory includes a set of device profiles. The mobile device also includes an adjust settings module. The adjust settings module is configured to determine a current speed of the mobile device. The adjust settings module is also configured to associate at least the current speed of the mobile device with a second device profile within the device profile memory. The second device profile is a member of the set of device profiles. The adjust setting module is also configured to adjust at least one user-interface setting of the mobile device based on the second device profile. The at least one user-interface setting is associated with an audio or visual user-interface element of the mobile device.

According to various aspects of the subject technology, a non-transitory computer-readable medium is provided. The non-transitory computer-readable medium includes instructions that, when executed by a computer, cause the computer to implement a method for modifying at least one setting of a mobile device. The instructions include code for determining a current speed of the computer. The instructions also include code for associating at least the current speed of the computer with a device profile. The device profile is a member of a set of device profiles stored within the computer. The instructions also include code for adjusting at least one user-interface setting of the computer based on the device profile. The at least one user-interface setting is associated with an audio or visual user-interface element of the computer.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several aspects of the disclosed subject matter are set forth in the following figures.

FIG. 3 illustrates and example of the device profile memory of FIG. 1.

DETAILED DESCRIPTION

Figure 1:
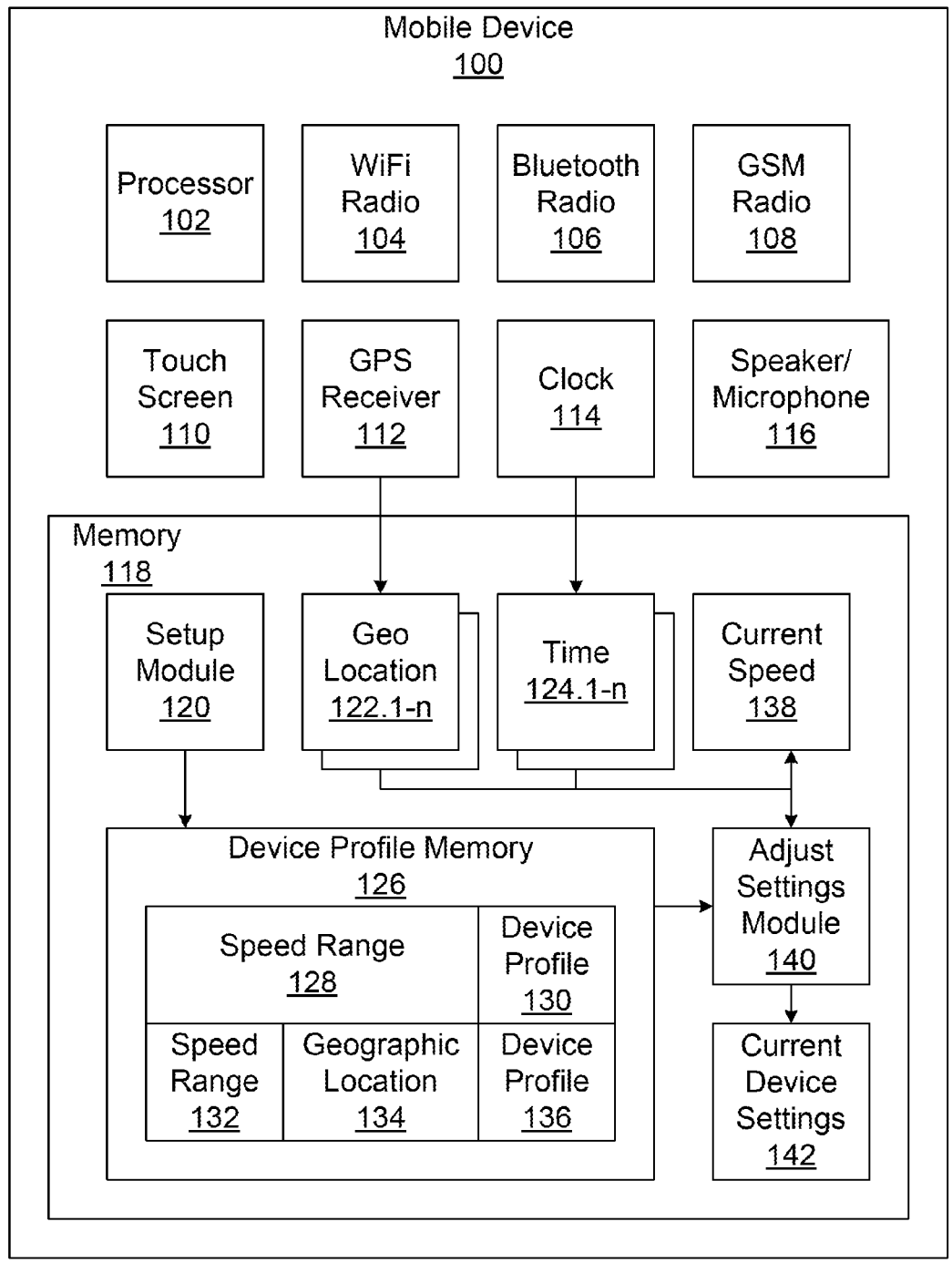
FIG. 1 illustrates an example of a mobile device configured to adjust settings based on speed.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology relates to techniques for modifying at least one setting of a mobile device. The at least one setting may include a ring tone, a ring volume, a silent mode, a speaker setting, a button size setting, a short-range radio setting, or a call forward setting. According to one approach, the mobile device may determine determining a first geographic location of the mobile device. The first geographic location is associated with a first time. The mobile device may also determine a second geographic location of the mobile device. The second geographic location is associated with a second time. For example, the mobile device may be at the first geographic location at the first time and at the second geographic location at the second time. The mobile device may determine a speed of the mobile device based on the first geographic location, the first time, the second geographic location, and the second time. For example, the speed of the mobile device may be calculated as the distance between the first geographic location and the second geographic location divided by the time difference between the first time and the second time. The mobile device may associate at least the speed of the mobile device with a device profile. The device profile is a member of a set of device profiles stored within the mobile device. The device profile may be associated with the speed of the mobile device or with the speed and at least one of the current geographic location of the mobile device and the current time. The mobile device may adjust at least one user-interface setting of the mobile device based on the device profile. The at least one user-interface setting may be associated with an audio or visual user-interface element of the mobile device.

Some users of mobile devices prefer to have certain setting or profiles when they are travelling at certain speeds. For example, when a user is driving a car, the user may desire the mobile phone to be in speakerphone mode and to display large buttons on the touch screen; when a user is flying in an airplane, the user may desire the mobile phone to enable the WiFi radio and disable the cellular radio and the Bluetooth radio. In order to effect these settings, the user typically must manually change the settings on the mobile phone whenever the user moves between not travelling, travelling by car, and travelling by airplane. Oftentimes, the user may forget to manually update the settings on the mobile phone and may be inconvenienced. Alternatively, the user may waste time to adjust the settings. As the foregoing illustrates, an approach for adjusting user-interface settings of a mobile device based on the speed of the mobile device may be desirable.

FIG. 1 illustrates an example of a mobile device 100 configured to adjust its settings based on speed.

As shown, the mobile device 100 includes a processor 102, a WiFi radio 104, a Bluetooth radio 106, a global system for mobile communications (GSM) radio 108, a touch screen 110, a global positioning system (GPS) receiver 112, a clock 114, a speaker/microphone 116, and a memory 118.

The processor 102 is configured to process data and execute computer instructions stored in a computer memory, such as memory 118. The processor 102 may be a central processing unit (CPU).

The WiFi radio 104, Bluetooth radio 106, and GSM radio 108 allow the mobile device 100 to connect with a wireless local area network (WLAN) or the Internet, a short-range communication system, and a cellular network, respectively. In some aspects, one or more of these radios may be omitted, replaced with other radios, or provided in addition to other radios. Specifically, the WiFi radio 104 may be replaced with any other radio that allows the mobile device 100 to connect to the Internet. The Bluetooth radio 106 may be replaced with any radio that allows for short-range communication. The GSM radio 108 may be replaced with any other cellular radio, for example, a code division multiple access (CDMA) radio (not illustrated).

The mobile device 100 may also include a touch screen 110. The touch screen 110 may be a liquid crystal display (LCD) or plasma screen that is capable of detecting touch-based input by a human finger and/or a stylus. Persons skilled in the art will recognize that the touch screen 110 may be replaced with other visual input/output devices, for example a keyboard and a standard non-touch screen (not illustrated).

The GPS receiver 112 is configured to determine a geographic location 122 of the mobile device 100 based on data received from GPS satellites. In one implementation, the mobile device may store multiple geographic locations 122.1-$n$ received from the GPS receiver 112 at different instances. Persons skilled in the art would understand that the GPS receiver 112 may be replaced with other hardware or software configured to determine a current location 122 of the mobile device 100. For example, a cellular tower triangulation module, or an association between WiFi networks and locations could be implemented. The user of the mobile device 100 may opt-out of having the mobile device 100 determine or store its geographic location 122.1-$n$ or the user may have to affirmatively provide permission for the mobile device 100 to determine or store its geographic location 122.1-$n$. In some example aspects the user opts-out and in other example aspects the user affirmatively provides permission.

The clock 114 is configured to determine a current time 124. The clock 114 may be manually set by a user of the mobile device 100. Alternatively, the clock 114 may obtain the current time from the cellular network using the GSM radio 108 or from the Internet using either GSM radio 108 or WiFi radio 104. Additionally, the clock 114 may be an atomic or automatically setting clock that is set by a manufacturer of the mobile device 100.

The speaker/microphone 116 is configured to allow the mobile device 100 to provide audio output and receive audio input. The speaker/microphone 116 may allow the mobile device 100 to function as one or more of a telephone, a music player, a voice recorder, a frequency or amplitude modulation radio or an Internet radio. Furthermore, the speaker/microphone 116 may operate in conjunction with the touch screen 110 to provide video viewing or video calling functionality.

The memory 118 is configured to store data and/or instructions that may be executed by processor 102. As shown, the memory 118 includes a setup module 120, geographic locations 122.1-$n$, times 124.1-$n$, a device profile memory 126, an adjust settings module 140, and current device settings 142.

The setup module 120 is configured to setup the device profile memory 126 of the mobile device 100. The setup module 120 may operate by receiving an input including a speed range. The input may be from a user of the mobile device 100 and may be entered, for example, via the touch screen 110 or via a keypad in response to a prompt on the screen. The speed range may include a minimum speed and a maximum speed. For example, for a driving profile, a minimum speed may be 30 km/hour and a maximum speed may be 200 km/hour. Alternatively, the speed range may include only a minimum speed or only a maximum speed. For example, a relaxing speed range may include a maximum speed of 5 km/hour or an airplane profile may include a minimum speed of 500 km/hour. The setup module 120 may also receive, as input, a device profile associated with the speed range. The device profile may be entered by the user of the mobile device 100, in response to on-screen prompts, via the touch screen 110 or the keypad of the mobile device 100. The device profile may specify at least one user-interface setting of the mobile device 100. The at least one user-interface setting may be associated with an audio or visual user-interface element of the mobile device. Example user-interface elements include ring tone, ring volume, and button sizes. The setup module 120 may store the device profile associated with the speed range in the mobile device 100, for example, in the device profile memory 126. As illustrated, the device profile memory 126 stores device profiles 130 and 136, which may have been entered via the operation of the setup module 120.

As illustrated, multiple device profiles 130 and 136 may be stored in the device profile memory 126, where each device profile 130 and 136 is associated with a speed range 128 or 132, respectively. The device profiles 130 and 136 may correspond to at least one device setting that includes a ring tone, a ring volume, a silent mode, a speaker setting associated with the speaker/microphone 116, a button size setting associated with the touch screen 110, a short-range radio setting associated with WiFi radio 104 or Bluetooth radio 106 or a call forward setting. The operation of the setup module 120 is described in more detail in conjunction with FIG. 5, below.

In one implementation, one of the device profiles 130 or 136 may correspond to a geographic location or a time. For example, device profile 136 corresponds to both a geographic location 134 and a speed range 132. Such a profile may be useful, for example, if a user of the mobile device 100 frequently drives in a city where one cannot operate a mobile device while driving. In one implementation, the user of the mobile device 100 could set a device profile 136 that would cause the mobile device to forego ringing and forward all calls to voicemail when the mobile device is within the city and travelling with the speed range exceeding 25 km/hour.

The geographic locations 122.1-n store the current or former geographic locations of the mobile device 100. The geographic locations 122.1-n may be determined by the GPS receiver 112. Alternatively, the geographic locations 122.1-n may be determined by cellular tower triangulation or based on information stored in a WiFi network to which WiFi radio 104 is connected. Persons skilled in the art will recognize other techniques for determining the current location 122.1-n.

The time 124.1-n may be received from the clock 114. Alternatively, the time 124.1-n may be received from a network clock external to the mobile device 100 over either the WiFi radio 104, the Bluetooth radio 106, the GSM radio 108 or any other radio or network interface available on the mobile device 100. Each time 124.1-n may be associated with a respective geographic location 122.1-n corresponding to the time. For example, at time 124.1, the mobile device 100 may have been at geographic location 122.1, at time 124.2, the mobile device 100 may have been at geographic location 122.2, at time 124.k, the mobile device 100 may have been at geographic location 122.k, etc.

The current speed 138 may be determined based on two or more of the geographic locations 122 and two or more corresponding times 124. The current speed 138 may correspond to a speed within the last second or to a weighted average speed. For example, to determine whether the mobile device 100 should be in a driving mode, an average speed over 1-5 minutes may be used, such that the mobile device 100 exits the driving mode when the driver stops driving, but not when the driver is temporarily stopped, for example, at a red light. Alternatively, the current speed 138 may correspond to an average speed over a shorter time. For example, a mobile device 100 may exit a jogging mode whenever the user slows down for even a short time. The user of the mobile device 100 may opt-out of having the mobile device 100 determine or store its current speed 138 or the user may have to affirmatively provide permission for the mobile device 100 to determine or store its current speed 138. In some example aspects the user opts-out and in other example aspects the user affirmatively provides permission.

The adjust settings module 140 is configured to modify at least one setting of the mobile device 100. The adjust settings module 140 receives as input or determines (e.g., based on geographic locations 122 and times 124) the current speed 138 and information from the device profile memory 126. In one implementation, the adjust setting module may also receive one or more geographic location 122 and one or more time 124. Based on this information, the adjust settings module 140 associated one or more of the current speed 138, the geographic location 122, or the time 124 with current device settings 142, which the adjust settings module 140 then provides as output and causes the mobile device 100 to implement. The adjust settings module 140 may implement the settings associated with a device profile 132 of 138 entered using the setup module 120 or the settings associated with a device profile 132 or 138 that was not entered using the setup module 120 but was input to the mobile device 100 during the initial configuration of the mobile device 100. The operation of the adjust settings module 140 is described in more detail in conjunction with FIG. 2 and FIG. 3, below.

Figure 2:
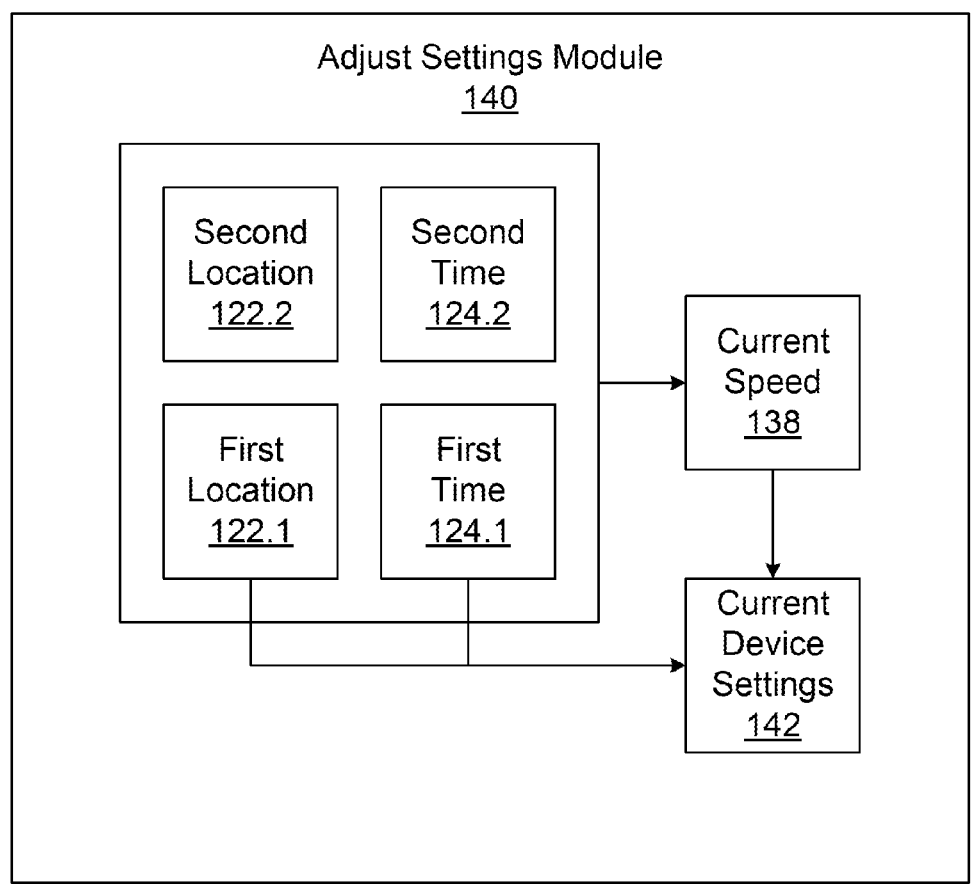
FIG. 2 illustrates an example of the adjust settings module of FIG. 1.

FIG. 2 illustrates an example of the adjust settings module 140 in more detail. As shown, the adjust settings module 140 includes a first geographic location 122.1, a first time 124.1, a second geographic location 122.2, a second time 124.2, a current speed 138, and current device settings 142. The first geographic location 122.1 and the first time 124.1 may correspond to the current geographic location of the mobile device 100 and the current time, while the second geographic location 122.2 and second time 124.2 may correspond to a location of the mobile device 100 at a past time. The mobile device 100 may be at first geographic location 122.1 at first time 124.1 and at second geographic location 122.2 at second time 124.2. The adjust settings module 140 may determine the current speed 138 of the mobile device 100 based on the combination of the first geographic location 122.1, the first time 124.1, the second geographic location 122.2, and the second time 124.2. For example, the current speed 138 may be calculated as the distance between the first geographic location 122.1 and the second geographic location 122.2 divided by the time difference between the first time 124.1 and the second time 124.2. The distance may be measured, for example, in kilometers and the time difference may be measured, for example, in hours. Example time differences between the first time 124.1 and the second time 124.2 may be one second, two seconds, ten seconds, one minute, five minutes, ten minutes, or one hour, depending on the need for a relatively instantaneous versus an average current speed 138.

The adjust settings module 140 may also include current device settings 142. The current device settings 142 may be determined based on the current speed 138. Optionally, the current device settings 142 may also be determined based on the first geographic location 122.1 or the first time 124.1. For example, a user of the mobile device 100 may have highway driving settings for travelling at speeds above 90 km/hour at any time, New York City driving settings for travelling at speeds between 30 km/hour and 90 km/hour within New York City, or nighttime driving settings for travelling at speeds above 30 km/hour between 6 PM and 6 AM. In one example, the mobile device may include Los Angeles morning commute driving settings for travelling at speeds above 10 km/hour within the City of Los Angeles between 6 AM and 11 AM.

FIG. 3 illustrates an example of the device profile memory 126. As shown, the device profile memory 126 includes device profiles 130, 136, 304, 308, 312, 316, 322, and 330.

As illustrated, device profile 132 corresponds to a speed range 128. For example, device profile 132 may correspond to a jogging profile with a corresponding speed range 128 of between 6 and 15 km/hour. Device profile 136 corresponds to a speed range 132 and a geographic location 302. For example, device profile 136 may correspond to a railroad train profile, having a corresponding speed range 132 of 20-80 km/hour and a geographic location 134 corresponding to the location of a railroad on which the user of the mobile device 100 travels.

Device profile 304 may correspond only to a geographic location 302. For example, a user might prefer to have certain settings for the office location of the user, regardless of the time when the user is in the office. In this case, the geographic location 302 may correspond to the office location of the user.

Device profile 308 may correspond only to a time range 306. For example, a user might prefer to have certain settings for business hours on weekdays. In this case, the time range 306 may correspond to business hours on weekdays.

Device profile 312 may correspond to a minimum speed 310. For example, a user might prefer to have the mobile device enter a driving mode whenever the mobile device is travelling at a speed above 10 miles per hour. In this case, the minimum speed 310 would correspond to 10 miles per hour.

Device profile 316 may correspond to a speed range 314. For example, a user might prefer to have the mobile device enter a bicycling mode whenever the mobile device is travelling at speeds between 10 and 25 miles per hour. In this case, the speed range would correspond to between 10 and 25 miles per hour.

Device profile 322 corresponds to a speed range 318 and a time range 320. For example, if a user frequently drives at nighttime in a jurisdiction where using a mobile device while driving at nighttime is prohibited, the device profile 322 could correspond to a driving speed range 318 (e.g., above 30 km/hour) and a time range 320 corresponding to the nighttime (e.g., between 7 PM and 5 AM).

Device profile 330 may correspond to all three of a speed range 324, a geographic location 326, and a time range 328. For example, a user may wish to associate device profile 330 with a boating speed range (e.g. 10-30 km/hour), while located on a specific lake, at nighttime. In this case, the speed range 324 would correspond to the boating speed range, the geographic location 326 would correspond to the specific lake, and the time range 328 would correspond to nighttime.

It should be noted that multiple device profiles 130, 136, 304, 308, 312, 316, 322, or 330 may be stored, and a device profile 130, 136, 304, 308, 312, 316, 322, or 330 that is stored may later be accessed in order to either implement or modify the device profile 130, 136, 304, 308, 312, 316, 322, or 330. The list of data that may correspond to device profiles 132, 138, 304, 308, 312, 316, 322, or 330 is exemplary and not exclusive. Other device profiles based on the geographic location 122, the time 124 or the current speed 138 of the mobile device 100 may be implemented in conjunction with the subject technology.

Figure 4:
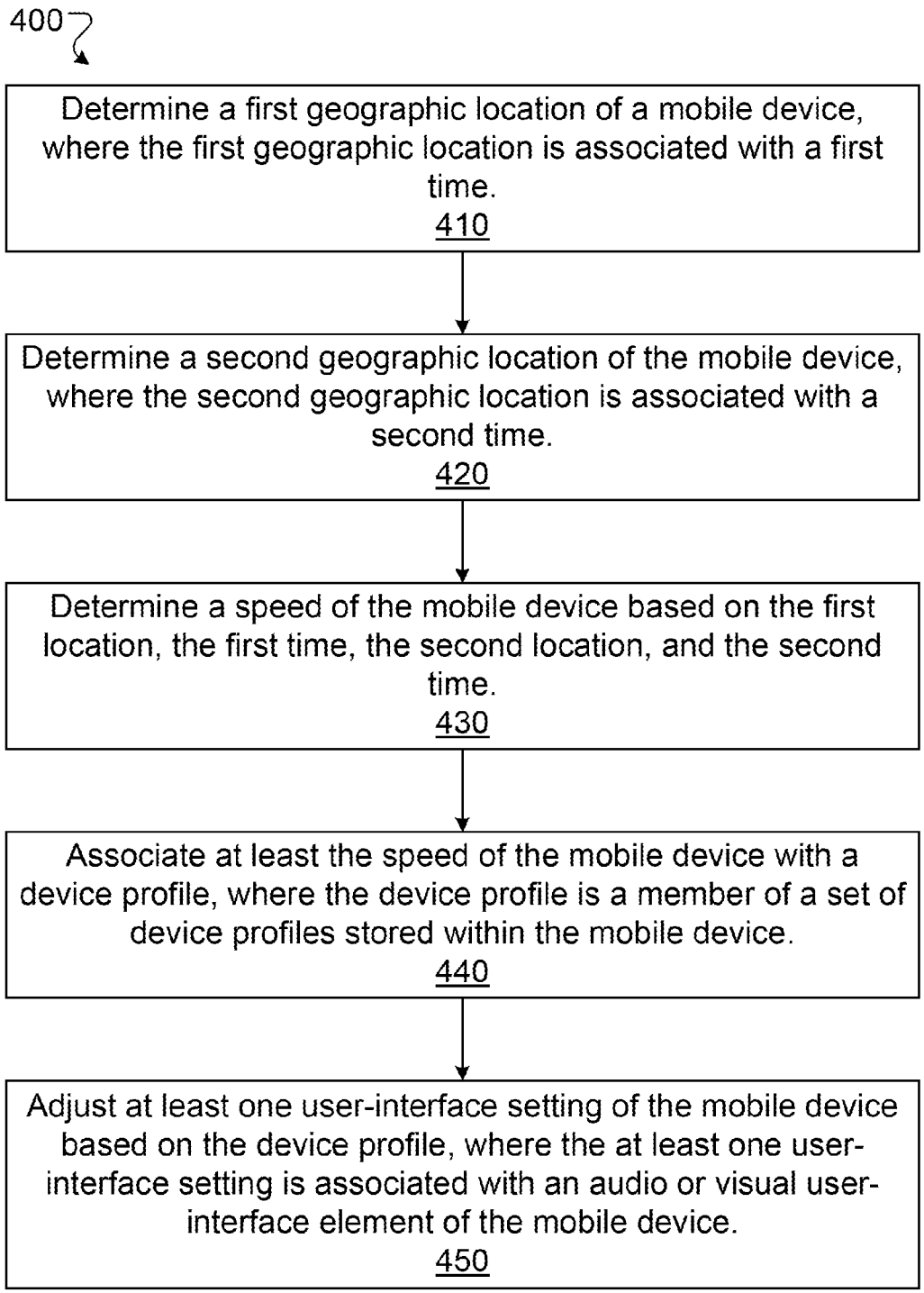
FIG. 4 illustrates an example of a process by which at least one setting of a mobile device is adjusted based on a speed of the mobile device.

FIG. 4 illustrates an example of a process 400 by which at least one setting of a mobile device is adjusted based on a speed of the mobile device.

The process 400 begins at step 410, where the mobile device determines a first geographic location of the mobile device. The first geographic location may be associated with a first time, i.e., the mobile device may be at the first geographic location at the first time. The user may opt-out of having the mobile device determine or store its geographic location or the user may have to affirmatively provide permission for the mobile device to determine or store its geographic location. In some example aspects the user opts-out and in other example aspects the user affirmatively provides permission.

In step 420, the mobile device determines a second geographic location of the mobile device. The second geographic location may be associated with a second time, i.e., the mobile device may be at the second geographic location at the second time.

In step 430, the mobile device determines a speed of the mobile device based on the first geographic location, the first time, the second geographic location, and the second time. For example, the speed of the mobile device may be calculated as a distance between the first geographic location and the second geographic location divided by a time difference between the first time and the second time. The user may opt-out of having the mobile device determine or store its speed or the user may have to affirmatively provide permission for the mobile device to determine or store its speed. In some example aspects the user opts-out and in other example aspects the user affirmatively provides permission.

In step 440, the mobile device associated at least the speed of the mobile device with a device profile. For example, the mobile device may associate the speed of the mobile device with a walking device profile if the speed is between 5 km/hour and 10 km/hour, with a driving device profile if the speed is between 10 km/hour and 200 km/hour, or with an airplane device profile if the speed exceeds 200 km/hour. Example device profiles may include one or more of: a walking device profile, a jogging device profile, a running device profile, a biking device profile, a public transportation device profile, an airplane device profile, or a boating device profile. The device profile may be a member of a set of device profiles stored within the mobile device.

In one example, both the speed and the geographic location of the mobile device may be associated with a device profile. For example, the speed and geographic location of the mobile device may be associated with a boating device profile if the geographic location of the mobile device is within a water-covered geographic region and the mobile device is travelling at a speed within a boating speed range, e.g., between 5 km/hour and 50 km/hour. Alternatively, the speed and geographic location of the mobile device may be associated with a land-based travel speed range is the speed is within a land-based travel speed range (e.g., between 5 km/hour and 200 km/hour) and the geographic location of the mobile device is within a non-water-covered geographic region.

In another example, both the speed and the time of the mobile device may be associated with a device profile. For example, a user of the mobile device may create a daytime driving profile if the speed of the mobile device is within a driving speed range, e.g., between 10 km/hour and 200 km/hour, and the time is within a daytime time range, e.g., between 6 AM and 6 PM. The user of the mobile device may also create a nighttime driving profile if the speed of the mobile device is within the driving speed range and the time is within a nighttime time range, e.g., between 6 PM and 6 AM.

In step 450, the mobile device adjusts at least one user-interface setting of the mobile device based on the device profile. The at least one user-interface setting may be associated with an audio or visual user-interface element of the mobile device. Example user-interface elements include one or more of: a ring tone, a ring volume, a silent mode, a speaker setting, a short range radio setting, a button size setting, or a call forward setting. After step 450, the process 400 ends.

Figure 5:
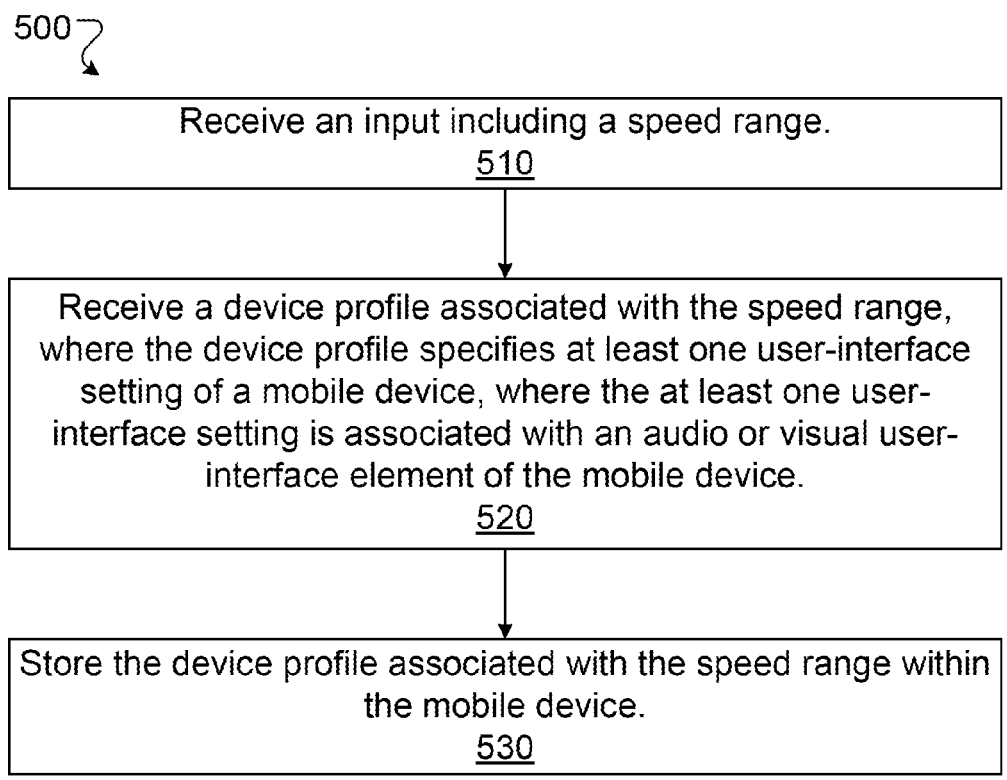
FIG. 5 illustrates an example of a process by which a device profile for a mobile device based on the speed of the mobile device is received and stored.

FIG. 5 illustrates an example of a process 500 by which a device profile for a mobile device based on the speed of the mobile device is received and stored.

The process 500 begins at step 510, where the mobile device receives an input including a speed range. The input may be entered by a user of the mobile device. The speed range may include a minimum speed and a maximum speed, a minimum speed and no maximum speed, or a maximum speed and no minimum speed. In one implementation, the input may also include a geographic region or a time range. The geographic region may include one or more of a street address, a jurisdiction, an identified region within a map, a water-covered region, or a non-water-covered region. The time range may include a start time and an end time, e.g., Saturday at 9 AM until Saturday at 6 PM. The time range may include a recurring time range, e.g., every Saturday between 9 AM and 6 PM.

In one example, the mobile device receives the input including the geographic region by displaying a map on a touch screen and receiving an input representing a user touching a region of the map on the touch screen. The mobile device determines the geographic region based on the region of the map touched by the user. For example, the mobile device may display a map of the State of California on the touch screen and the user may touch the City of San Francisco on the map. Based on the user touching the City of San Francisco on the map, the mobile device may determine that the input including the geographic region is intended to represent the City of San Francisco.

In step 520, the mobile device receives, as input, a device profile associated with the speed range. The device profile may also be associated with the geographic region or the time range provided by the user in step 510. The device profile may specify at least one user-interface setting of the mobile device. The at least one user-interface setting of the mobile device may be associated with an audio or visual user-interface element of the mobile device. Example audio user-interface elements include a ringtone, a ring volume, or a text message tone. Example visual user-interface elements include screen brightness or button size on a touch screen.

In step 530, the mobile device stores the device profile associated with the speed range, the geographic region, or the time range within the mobile device. After step 530, the process 500 ends.

Figure 6:
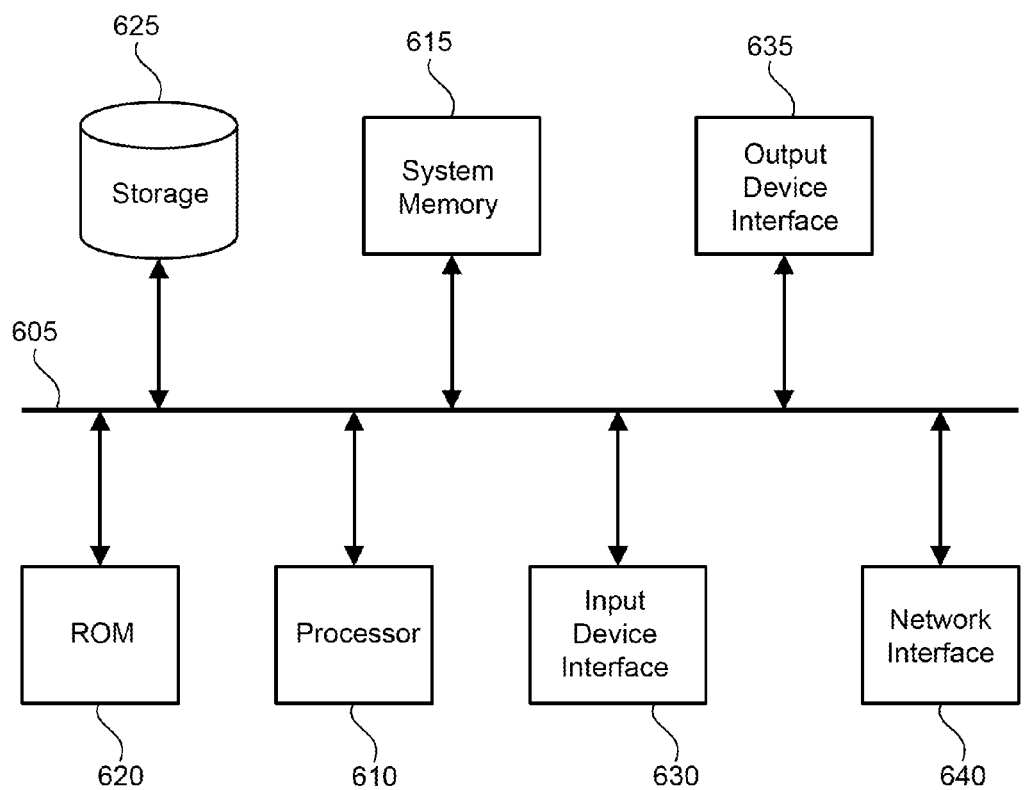
FIG. 6 conceptually illustrates an electronic system with which some implementations of the subject technology are implemented.

FIG. 6 conceptually illustrates an electronic system 600 with which some implementations of the subject technology are implemented. For example, the mobile device 100 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for mobile device profiling based on speed in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method of adjusting settings for a mobile device, the method comprising:
receiving an input via an input device on a mobile device, the input comprising a plurality of different speed ranges for the mobile device;
receiving a device profile associated with each of the plurality of different speed ranges, wherein each device profile specifies at least one user-interface setting of the mobile device such that the mobile device is configured to implement the at least one user-interface setting when the mobile device is moving at a speed within the speed range, wherein the at least one user-interface setting includes one or more of a ring tone, a ring volume, a silent mode, a speaker setting, a button size setting, a short-range radio setting, or a call forward setting of the mobile device, wherein each device profile is associated with a different style of transportation; and
storing the device profile associated with each of the plurality of different speed ranges within the mobile device;
wherein the plurality of device profiles comprises two or more of a walking device profile, a jogging device profile, a running device profile, a biking device profile, a public transportation device profile, an airplane device profile, or a boating device profile.

2. The method of claim 1, wherein each speed range comprises a minimum speed and a maximum speed.

3. The method of claim 1, wherein the input further comprises a geographic region, further wherein storing each device profile associated with the speed range within the mobile device comprises storing the device profile in association with the speed range and the geographic region.

4. The method of claim 3, wherein the geographic region comprises one or more of a street address, a jurisdiction, an identified region within a map, a water-covered region, or a non-water-covered region.

5. The method of claim 3, wherein receiving the input comprising the geographic region comprises:
displaying a map on a touch screen;
receiving an input representing a user touching a region of the map on the touch screen; and
determining the geographic region based on the region of the map.

6. The method of claim 1, wherein the input further comprises a time range, further wherein storing each device profile associated with the speed range within the mobile device comprises storing the device profile in association with the speed range and the time range.

7. The method of claim 6, wherein the time range comprises a start time and an end time.

8. The method of claim 6, wherein the time range comprises a recurring time range.

9. A mobile device comprising:
a setup module implemented by one or more processors configured to:
receive an input via an input device on a mobile device, the input comprising a speed range for the mobile device,
receive a first device profile associated with the speed range, wherein the first device profile specifies at least one user-interface setting of the mobile device such that the mobile device is configured to implement the at least one user-interface setting when the mobile device is moving at a speed within the speed range, wherein the at least one user-interface setting includes one or more of a ring tone, a ring volume, a silent mode, a speaker setting, a button size setting, a short-range radio setting, or a call forward setting of the mobile device, and
store the first device profile associated with the speed range in a device profile memory within the mobile device, wherein the device profile memory comprises a set of device profiles; and
an adjust settings module implemented by one or more processors configured to:
determine a current speed of the mobile device,
associate at least the current speed of the mobile device with a second device profile within the device profile memory, wherein the second device profile is a member of the set of device profiles; and
adjust at least one user-interface setting of the mobile device based on the second device profile, wherein the at least one user-interface setting includes one or more of a ring tone, a ring volume, a silent mode, a speaker setting, a button size setting, a short-range radio setting, or a call forward setting of the mobile device:
wherein the first device profile and the second device profile are associated with different styles of transportation; wherein the plurality of device profiles comprises two or more of a walking device profile, a jogging device profile, a running device profile, a biking device profile, a public transportation device profile, an airplane device profile, or a boating device profile.

10. The mobile device of claim 9, wherein the first device profile is different from the second device profile.

11. A non-transitory computer-readable medium comprising instructions which, when executed a computer, cause the computer to implement a method comprising:

receiving an input comprising a plurality of different speed ranges for the mobile device and a geographic region, wherein receiving the input comprising the geographic region comprises:

displaying a map on a touch screen;

receiving an input representing a user touching a region of the map on the touch screen;

determining the geographic region based on the region of the map;

receiving a device profile associated with each of the plurality of different speed ranges and the geographic region, wherein each device profile specifies at least one user-interface setting of the mobile device such that the mobile device is configured to implement the at least one user-interface setting when the mobile device is moving at a speed within the speed range in the geographic area, wherein the at least one user-interface setting is associated with an audio or visual user-interface element of the mobile device, wherein each device profile is associated with a different style of transportation; and storing the device profile associated with each of the plurality of different speed ranges and the geographic region within the mobile device;

wherein the plurality of device profiles comprises two or more of a walking device profile, a jogging device profile, a running device profile, a biking device profile, a public transportation device profile, an airplane device profile, or a boating device profile.

12. The non-transitory computer-readable medium of claim 11, wherein each speed range comprises a minimum speed and a maximum speed.

13. The non-transitory computer-readable medium of claim 11, wherein the geographic region comprises one or more of a street address, a jurisdiction, an identified region within a map, a water-covered region, or a non-water-covered region.

14. The non-transitory computer-readable medium of claim 11, wherein the input further comprises a time range, further wherein storing the device profile associated with each of the plurality of different speed ranges within the mobile device comprises storing the device profile in association with the speed range and the time range.

15. The non-transitory computer-readable medium of claim 14, wherein the time range comprises a start time and an end time.

16. The non-transitory computer-readable medium of claim 14, wherein the time range comprises a recurring time range.

17. The non-transitory computer-readable medium of claim 14, wherein the region on the map comprises a representation of a city on the map.

18. The non-transitory computer-readable medium of claim 17, wherein the geographic region comprises the city.

19. The non-transitory computer-readable medium of claim 14, wherein the at least one audio or visual user-interface element comprises the touch screen.

* * * * *